US012799328B2

(12) United States Patent
Tokuzumi et al.

(10) Patent No.: US 12,799,328 B2
(45) Date of Patent: Nov. 17, 2026

(54) PLATED MOLDING, METHOD OF PRODUCING PLATED MOLDING, AND HOUSING COMPONENT

(71) Applicant: Toray Industries, Inc., Tokyo (JP)

(72) Inventors: Keita Tokuzumi, Nagoya (JP); Kazuya Okubo, Nagoya (JP); Makoto Wada, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 209 days.

(21) Appl. No.: 18/550,307

(22) PCT Filed: Mar. 3, 2022

(86) PCT No.: PCT/JP2022/009076
§ 371 (c)(1),
(2) Date: Sep. 13, 2023

(87) PCT Pub. No.: WO2022/202184
PCT Pub. Date: Sep. 29, 2022

(65) Prior Publication Data
US 2024/0174859 A1 May 30, 2024

(30) Foreign Application Priority Data
Mar. 22, 2021 (JP) ................................. 2021-047222

(51) Int. Cl.
*C08L 81/02* (2006.01)
*C08G 75/0209* (2016.01)
(Continued)

(52) U.S. Cl.
CPC .......... *C08L 81/02* (2013.01); *C08G 75/0209* (2013.01); *C08K 7/14* (2013.01);
(Continued)

(58) Field of Classification Search
CPC ............... C08L 81/02; C08L 2205/025; C08L 2205/03; C23C 18/204; C23C 18/22;
(Continued)

(56) References Cited

U.S. PATENT DOCUMENTS 5,185,185 A 2/1993 Nishizawa et al.
2007/0160810 A1 7/2007 Hayashi et al.
(Continued)

FOREIGN PATENT DOCUMENTS

JP 1987-270659 11/1987
JP 03-197687 8/1991
(Continued)

OTHER PUBLICATIONS

Translation of JP2018030349A (bib, claims, description). (Year: 2018).*
(Continued)

*Primary Examiner* — Catherine A. Simone
(74) *Attorney, Agent, or Firm* — DLA Piper LLP (US)

(57) ABSTRACT

A plated molding including a plating layer formed on a part or all of a surface of the molding molded with a polyphenylene sulfide resin composition comprising 30 to 200 parts by weight of a fibrous filler (B) based on 100 parts by weight of a polyphenylene sulfide resin (A), wherein an arithmetic mean roughness of the surface of the plating layer of the plated molding is 1.5 μm or less.

6 Claims, 1 Drawing Sheet

(51) Int. Cl.

| | |
|---|---|
| ***C08K 7/14*** | (2006.01) |
| ***C23C 18/20*** | (2006.01) |
| ***C23C 18/22*** | (2006.01) |
| ***C23C 18/38*** | (2006.01) |
| ***C23C 28/02*** | (2006.01) |
| ***C25D 5/56*** | (2006.01) |

(52) U.S. Cl.
CPC ............ *C23C 18/204* (2013.01); *C23C 18/22* (2013.01); *C23C 18/38* (2013.01); *C23C 28/023* (2013.01); *C25D 5/56* (2013.01); *C08L 2205/025* (2013.01); *C08L 2205/03* (2013.01)

(58) Field of Classification Search
CPC ... C23C 18/38; C23C 28/023; C08G 75/0209; C08K 7/14; C25D 5/56
See application file for complete search history.

(56) References Cited

U.S. PATENT DOCUMENTS

| | | | | |
|---|---|---|---|---|
| 2018/0162106 A1* | 6/2018 | Fujikawa | .............. | B32B 15/098 |
| 2019/0070631 A1* | 3/2019 | Fujikawa | ................. | B05D 7/24 |

FOREIGN PATENT DOCUMENTS

| | | |
|---|---|---|
| JP | 2003-96221 | 3/2003 |
| JP | 2005-171242 | 6/2005 |
| JP | 2005-200693 | 7/2005 |
| JP | 2006-219715 | 8/2006 |
| JP | 2016-188289 | 11/2016 |
| JP | 2017-149797 | 8/2017 |
| JP | 2018030349 A * | 3/2018 |

OTHER PUBLICATIONS

International Search Report dated Apr. 7, 2022, in counterpart International Application No. PCT/JP2022/009076 along with an English translation.

Nomura, T. et al.: “Formation of Planting Films on Polyphenylene Sulfide (PPS) Resins Treated by Atmospheric UV Irradiation” *Journal of the Surface Finishing Society of Japan*, 2017, vol. 68, (11), pp. 624-629, only first page submitted herewith with English abstract.

* cited by examiner

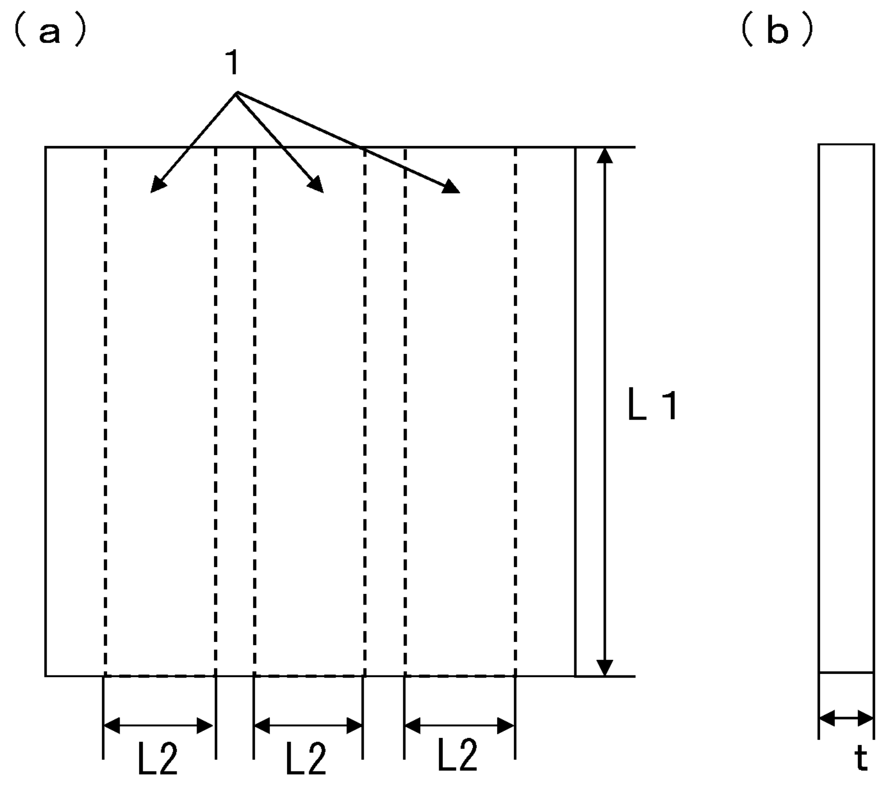
(a)
(b)
1
L1
L2
L2
L2
t

PLATED MOLDING, METHOD OF PRODUCING PLATED MOLDING, AND HOUSING COMPONENT

TECHNICAL FIELD

This disclosure provides plated moldings having excellent surface smoothness and adhesiveness and also ensuring high plating quality in severe environmental degradation tests such as thermal shock cycle tests, without compromising the various excellent properties inherent in polyphenylene sulfide resins.

BACKGROUND

Thermoplastic resin materials such as polyphenylene sulfide resin (sometimes "PPS resin") have been used in a variety of fields, mainly in electric, electronic, and automobile fields thanks to their excellent chemical resistance, heat resistance, flame retardance, electrical properties, and mechanical properties. However, the PPS resin, for example, is generally unsuitable for plating processing because of its excellent chemical resistance which makes it difficult to etch the surface of the molding resin.

Recently, a large number of sensors and electronic control units have been used in any and all fields, and there is a strong need to have electromagnetic shielding properties for the purpose of preventing mutual interference and to have thermal conductivity for the purpose of thermal management.

In response to these demands, plating processes of resin moldings have been performed, which can impart such properties and has been put into practical use. However, it is difficult to plate the above-described PPS resin because of its good chemical resistance. In addition, for plating of the PPS resin, its surface is subjected to more than enough surface roughening by blasting or strong acid, which may possibly bring high surface roughness of the resulting plated molding, and cause radio wave loss, loss in radio wave directivity, or the like. Therefore, its application is limited presently. For this reason, there has been a need for improvement in the plating processability (platability) of the PPS resin and surface smoothness of the resulting plated molding.

In JP 2003-96221 A, heat quantity of cold crystallization is set to 5.0 g/J or more for the purpose of improving platability to obtain a molding whose surface has low crystallinity, and a particular primer paint having active metal particles is used to obtain a plated molding having high adhesiveness.

JP 1987-270659 A discloses a resin composition in which potassium titanate is blended for the purpose of enhancing platability.

*Journal of the Surface Finishing Society of Japan,* 2017, vol. 68, (11), p 624-629, describes that etching process of a PPS resin with UV radiation and alkali improves plating adhesiveness.

However, in JP 2003-96221 A, a molding with low crystallinity spoils surface appearance, and significantly degrades decorativeness after plating, in particular. Furthermore, when used in a high-temperature environment, a change occurs in degree of crystallinity, which in turn brings about changes in dimensional properties and the like. Accordingly, the properties of the resulting plated molding are not satisfactory. In JP 1987-270659 A, the incorporation of metallic foreign materials such as potassium titanate will significantly impair the mechanical strength of the moldings. In *Journal of the Surface Finishing Society of Japan,* 2017, vol. 68, (11), p 624-629, non-reinforced PPS resins are shown to have effect. Meanwhile, reinforced PPS resins to which inorganic substances such as fibrous fillers added, have a disadvantage that the surface roughness is reduced, which prevents plating adhesiveness from increasing.

It could therefore be helpful to enable a plating layer having excellent surface smoothness to be formed without compromising the various excellent properties inherent in PPS resins, and provide a plated molding excellent in adhesiveness of the plating layer and ensures high plating quality even in severe environmental degradation tests such as thermal shock cycle tests as well as a method of production thereof.

SUMMARY

We thus provide:

(1) A plated molding comprising a plating layer formed on a part or all of the molding that is molded with a polyphenylene sulfide resin composition comprising 30 to 200 parts by weight of a fibrous filler (B) based on 100 parts by weight of a polyphenylene sulfide resin (A), wherein an arithmetic mean roughness of the surface of the plating layer of the plated molding is 1.5 μm or less.

(2) The plated molding according to (1), wherein the polyphenylene sulfide resin (A) comprises 20% by weight or more of a polyphenylene sulfide resin (A-1) having MFR of 50 to 600 g/10 min at 315 °C under a load of 2160 g, where the total amount of the polyphenylene sulfide resin (A) is 100% by weight.

(3) The plated molding according to (1) or (2), wherein the polyphenylene sulfide resin composition further comprises 1 to 30 parts by weight of a functional group-containing olefinic copolymer (C) containing at least one functional group selected from the group consisting of a glycidyl group, an acid anhydride group, a carboxyl group and a salt thereof, and an alkoxycarbonyl group based on 100 parts by weight of the polyphenylene sulfide resin (A).

(4) The plated molding according to any one of (1) to (3), wherein the polyphenylene sulfide resin (A) contains 50% by weight or more of a polyphenylene sulfide resin (A-1) having MFR of 50 to 600 g/10 min at 315 °C under a load of 2160 g, where the total amount of the polyphenylene sulfide resin (A) is 100% by weight.

(5) The plated molding according to (3) or (4), wherein the functional group contained in the functional group-containing olefinic copolymer (C) containing at least one functional group selected from the group consisting of a glycidyl group, an acid anhydride group, a carboxyl group and a salt thereof, and an alkoxycarbonyl group is a glycidyl group, and the glycidyl group concentration in the functional group-containing olefinic copolymer is 1.0 to 4.5% by weight.

(6) A method of producing a plated molding according to any one of (1) to (5), wherein the molding that is molded with the polyphenylene sulfide resin composition is subjected to a surface treatment process, a catalyst application process, an activation process, and a plating process in this order.

(7) The method according to (6), wherein the surface treatment process is performed according to the following procedure: (a) irradiating the surface of the molding from a position of 5 to 200 mm away from the surface of the molding with an ultraviolet light having a dominant wavelength in the range of 100 to 400 nm for 10 to 120 minutes; and (b) subsequently immersing the molding processed in (a) in an alkaline aqueous solution with a concentration of 5 to 40% by mass for 1 to 30 minutes.

(8) The method according to (6) or (7), wherein at least a part of the surface of the molding after the surface treatment process has pores with a diameter of 2 μm or less.

(9) A housing component including the plated molding according to any one of (1) to (5) as a part of its component.

We thus enable a plating layer having excellent surface smoothness to be formed without compromising the various excellent properties inherent in polyphenylene sulfide resins, and provide a plated molding excellent in adhesiveness of the plating layer and ensures high plating quality even in severe environmental degradation tests such as thermal shock cycle tests as well as a method of production thereof.

BRIEF DESCRIPTION OF THE DRAWINGS

FIGS. 1(*a*) and 1(*b*) show a test piece for measurement of peel strength wherein (a) is a plan view, and (b) is a side view.

REFERENCE SIGNS LIST

1 Cutout portion
L1 Width of test piece: 80 mm
L2 Width of cutout test piece: 15 mm
t Thickness of test piece: 3 mm

DETAILED DESCRIPTION

Below, an example will be described. In this specification, “weight” means “mass”.

The polyphenylene sulfide resin (A) is a polymer having repeating units represented by the structural formula:

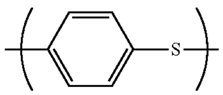

The polyphenylene sulfide resin (A) is preferably a polymer including 70 mol % or more, particularly 90 mol % or more of the repeating units represented by the above structural formula from the viewpoint of heat resistance. Further, less than 30 mol % of the repeating units of the polyphenylene sulfide resin (A) may be constituted by repeating units having the following structure:

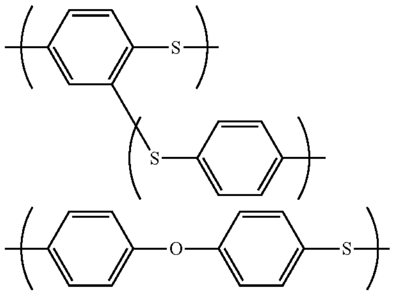

-continued

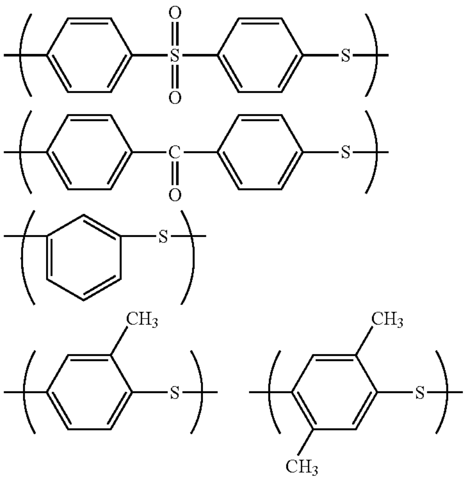

Next, a method of obtaining the polyphenylene sulfide resin (A) will be described. The method of producing PPS resin can produce by known methods including a front-end process, a polymerization reaction process, a recovery process, and a postprocessing process. It is preferred for raw materials and the front-end process used for the production of the PPS resin to be in accordance with a method described in JP 2017-155221 A. Our PPS resin preferably contains the polyphenylene sulfide resin (A-1) having MFR of 50 to 600 g/10 min at 315 °C. under a load of 2160 g (such PPS is sometimes abbreviated as “high viscosity PPS resin (A-1)” hereinafter). An exemplary method of obtaining the PPS resin having such characteristics includes producing through important steps described below. For example, the high viscosity polyphenylene sulfide resin having the above-described characteristics can be obtained by using a quenching method in the recovery process described below or by a method such as crosslinking through heat treatment in the presence of oxygen.

Hereinafter, the polymerization reaction process, the recovery process, and the postprocessing process will be described.

Polymerization Reaction Process

It is preferred to produce the PPS resin by reacting a sulfidation agent and a polyhalogenated aromatic compound in an organic polar solvent in a temperature range of 200 to 290 °C.

When starting the polymerization reaction process, the sulfidation agent and the polyhalogenated aromatic compound are added to the organic polar solvent, desirably in an inert gas atmosphere in a temperature range from room temperature to 220 °C, preferably 100 to 220 °C. The polymerization auxiliary may be added at this stage. There is no limitation on the order of charging the raw materials. They may be charged simultaneously.

The temperature of such a compound is usually raised to 200 °C to 290 °C. There is no limitation on a rate of temperature rise. Usually, a rate of 0.01 to 5 °C/min is selected. A rate of 0.1 to 3 °C/min is more preferable.

Generally, the temperature is finally raised to 250 to 290 °C, and the reaction is normally carried out at that temperature for 0.25 to 50 hours, preferably 0.5 to 20 hours.

The method in which, at a stage before reaching the final temperature, reaction is performed, for example, at 200 °C to 260 °C for a certain period and then the temperature is raised to 270 to 290 °C, is effective in obtaining a higher degree of polymerization. In this event, as the reaction time at 200 °C to 260 °C, normally, a range of 0.25 hours to 20 hours is selected. Preferably, 0.25 to 10 hours is selected.

To obtain a polymer with higher degree of polymerization, it is effective to perform the polymerization reaction in multiple stages. When the polymerization reaction is performed in multiple stages, it is effective to move to the next stage when the conversion ratio of the polyhalogenated aromatic compound in the system at 245 °C reaches 40 mol % or more, preferably 60 mol %.

Recovery Process

After the polymerization reaction process is completed, solid is recovered from the polymerization reaction products including a polymer, a solvent and the like.

A preferred method of recovering the PPS resin is to recover the PPS resin under a quenching condition. One of the preferred recovery methods is a flash method. The flash method is a method in which the polymerization reaction product is flashed from a state at a high temperature and pressure (usually, 250 °C or more, 8 kg/cm$^2$ or more) to an atmosphere at ordinary pressure or under reduced pressure, and the polymer is powdered and recovered while the solvent is recovered at the same time. The "flash" means to eject the polymerization reaction product through a nozzle. Specific examples of a medium used for flashing include nitrogen or water vapor under ordinary pressure, and the temperature at which flashing is performed is usually 150 °C to 250 °C.

Since the flash method can recover solid and a solvent at the same time, and also make the recovery time relatively shorter, it is a recovery method excellent in economy. In such a recovery method, an ionic compound such as sodium and an organic low-polymerization degree polymer (oligomer) tend to be easily incorporated into the polymer during the solidification process.

The recovery method of the PPS resin used for our production method is not limited to the flash method, but a method of recovering particulate polymer by gradually cooling the polymerization reaction product including polymer, solvent and the like (quenching method) may also be used so long as it satisfies our requirements. In view of economy, however, it is more preferable to use the PPS resin recovered by the flash method.

Postprocessing Process (Acid Treatment)

The PPS resin obtained through the above-described polymerization reaction process and recovery process is preferably subjected to acid treatment.

The acid used for the acid treatment is not particularly limited as long as it does not decompose the PPS resin. Examples of the acid include acetic acid, hydrochloric acid, sulfuric acid, phosphoric acid, silicic acid, carbonic acid, and propyl acid. Among them, acetic acid and hydrochloric acid are more preferably used. However, those that decompose and deteriorate the PPS resin such as nitric acid, are not favorable.

When an aqueous solution of the acid is used, water is preferably distilled water or deionized water. The aqueous acid solution preferably has a pH of 1 to 7, more preferably a pH of 2 to 4. Setting the pH to 7 or less prevents an amount of metal included in the PPS resin from increasing, which is preferable. The pH of 1 or more is preferable because an amount of volatile components included in the PPS resin can be reduced.

In the method of the acid treatment, the PPS resin is preferably immersed in the acid or the aqueous acid solution, which may be stirred and heated, as required. The temperature for the heating is preferably 80 to 250 °C, more preferably 120 to 200 °C, and still more preferably 150 to 200 °C. When the temperature is lower than 80 °C, the effect of the acid treatment is small, and the content of the metal increases. When the temperature is higher than 250 °C, the pressure increases too high, which is not preferred from a safety viewpoint. Further, when the PPS resin is treated by immersing it in the aqueous acid solution, such an acid treatment preferably brings the pH to less than 8, more preferably the pH to 2 to 8. Setting the pH to 8 or less prevents an amount of metal included in the resulting PPS resin from increasing, which is preferable.

The time for the acid treatment is preferably such that the reaction between the PPS resin and the acid is sufficiently equilibrated, and is preferably 2 to 24 hours when the treatment is performed at 80 °C, and preferably 0.01 to 5 hours when the treatment is performed at 200 °C.

The ratio of the PPS resin and the acid or the aqueous acid solution in the acid treatment is preferably such that the PPS resin is treated while the PPS resin is sufficiently immersed in the acid or the aqueous acid solution, and preferably 0.5 to 500 L, more preferably 1 to 100 L, still more preferably 2.5 to 20 L of the acid or the aqueous acid solution, with respect to 500 g of the PPS resin. With the acid or the aqueous acid solution of 0.5 L or more with respect to 500 g of the PPS resin, the PPS resin is sufficiently immersed in the aqueous solution, resulting in neither poor washing nor an increased amount of the metal included in the PPS resin, which is preferable. With the acid or the aqueous acid solution of 500 L or less with respect to 500 g of the PPS resin, the amount of the acid or the aqueous acid solution used is large excess with respect to the PPS resin, preventing production efficiency from significantly decreasing, which is preferable.

The acid treatment is performed by, for example, a method including adding a predetermined amount of the PPS resin to a predetermined amount of water and acid, and heating and stirring the mixture in a pressure vessel, or a method including continuously performing the acid treatment. As a method of separating the aqueous solution and the PPS resin from the treatment solution after the acid treatment, filtration using a sieve or a filter is convenient, and examples thereof include natural filtration, pressure filtration, filtration under reduced pressure, and centrifugal filtration. It is preferable to wash the surface of the PPS resin separated from the treatment solution with water or warm water several times to remove acid and impurities remaining thereon. Examples of the washing method include methods of separating the aqueous solution and the PPS resin, for example, by performing filtration while pouring water on the PPS resin on the filtration device, or by adding the separated PPS resin into a water prepared in advance, followed by another filtration. The water used for washing is preferably distilled water or deionized water. The PPS resin that has been subjected to the acid treatment as described above is considered to undergo changes, for example, in its terminal structure, and it is difficult to represent the structure of the PPS resin obtained by the acid treatment by a general formula, and it is also difficult to specify it by its characteristics. Therefore, the PPS resin can be specified only by the process (acid treatment) for obtaining the PPS resin.

Postprocessing Process (Hydrothermal Treatment)

It is preferable to perform hydrothermal treatment before the acid treatment process, and a method is as follows. The water used for the hydrothermal treatment is preferably distilled water or deionized water. The temperature for the hydrothermal treatment is preferably 80 to 250 °C, more preferably 120 to 200 °C, and still more preferably 150 to 200 °C. By setting the temperature to 80 °C or higher, the effect of the hydrothermal treatment can be sufficiently exhibited, and the amount of volatilized gas can be reduced. By setting the temperature to 250 °C or lower, increase in pressure can be suppressed, which is preferable from the viewpoint of safety.

The time for the hydrothermal treatment is preferably such that the extraction treatment with the PPS resin and hot water can be sufficiently performed, and is preferably 2 to 24 hours when the treatment is performed at 80 °C, and preferably 0.01 to 5 hours when the treatment is performed at 200 °C.

The ratio of the PPS resin and the hot water in the hydrothermal treatment is preferably such that the PPS resin is treated while the PPS resin is sufficiently immersed in the hot water. The ratio is preferably 0.5 to 500 L, more preferably 1 to 100 L, still more preferably 2.5 to 20 L of water to 500 g of the PPS resin. With the hot water of 0.5 L or more with respect to 500 g of the PPS resin, the PPS resin is sufficiently immersed in the aqueous solution, resulting in neither poor washing nor an increased amount of the metal included in the PPS resin, which is preferable. With the hot water of 500 L or less with respect to 500 g of the PPS resin, the amount of the water is large excess with respect to the PPS resin, preventing production efficiency from significantly decreasing, which is preferable.

There is no particular limitation on the operation of the hydrothermal treatment, and the hydrothermal treatment is performed by, for example, a method including adding a predetermined amount of the PPS resin to a predetermined amount of water and acid, followed by heating and stirring in a pressure vessel, or a method including continuously performing the hydrothermal treatment. A method of separating the aqueous solution and the PPS resin from the treatment solution after the hydrothermal treatment is not particularly limited, and filtration using a sieve or a filter is convenient, and examples thereof include natural filtration, pressure filtration, filtration under reduced pressure, and centrifugal filtration. It is preferable to wash the surface of the PPS resin separated from the treatment solution with water or warm water several times to remove impurities remaining thereon. A method of the washing is not particularly limited, and examples thereof include methods of separating the aqueous solution and the PPS resin, for example, by performing filtration while pouring water on the PPS resin on the filtration device or by adding the separated PPS resin into a water prepared in advance, followed by another filtration. The water used for washing is preferably distilled water or deionized water.

Since it is not preferable that the PPS terminal groups are decomposed during the acid treatment or the hydrothermal treatment, it is desirable to perform the acid treatment and the hydrothermal treatment in an inert atmosphere. Examples of the inert atmosphere include nitrogen, helium, and argon. From the economical viewpoint, a nitrogen atmosphere is preferred.

Postprocessing Process (Washing with Organic Solvent)

A process of washing the PPS resin with an organic solvent may be included before the process of performing the acid treatment or the hydrothermal treatment on the PPS resin, and the method is as follows. The organic solvent used for washing the PPS resin is not particularly limited as long as it does not decompose the PPS resin. Examples of such organic solvents include nitrogen-containing polar solvents such as N-methyl-2-pyrrolidone, dimethylformamide, dimethylacetamide, 1,3-dimethylimidazolidinone, hexamethylphorphorusamide, piperazinones, sulfoxide/sulfone-based solvents such as dimethylsulfoxide, dimethylsulfone, sulfolane, ketone-based solvents such as acetone, methyl ethyl ketone, diethyl ketone, asetophenone, ether-based solvents such as dimethyl ether, dipropyl ether, dioxzane, tetrahydrofuran, halogen-based solvents such as chloroform, methylene chloride, trichloroethylene, ethylene dichloride, perchloroethylene, monochloroethane, dichloroethane, tetrachloroethane, perchloroethane, chlorobenzene, alcohol/phenol-based solvents such as methanol, ethanol, propanol, butanol, pentanol, ethylene glycol, propylene glycol, phenol, cresol, polyethylene glycol, polypropylene glycol, and aromatic hydrocarbon-based solvents such as benzene, toluene, and xylene. Among these organic solvents, the use of N-methyl-2-pyrrolidone, acetone, dimethylformamide, chloroform, and the like is particularly preferred. These organic solvents may be used singly or in mixture of two or more kinds thereof.

Examples of the method of washing with an organic solvent include a method in which the PPS resin is immersed in the organic solvent, and appropriately heated and stirred as needed. The temperature during washing the PPS resin with the organic solvent is not particularly limited, and any temperature from room temperature to about 300 °C can be selected. There is a tendency that the higher the washing temperature, the higher the washing efficiency. Usually, sufficient effect can be obtained at the washing temperature from room temperature to 150 °C. It is also possible to wash under pressure at a temperature not lower than the boiling point of the organic solvent in a pressure vessel. There is no particular limitation on the washing time. In a case of batch-type washing, a sufficient effect can be obtained by washing for 5 minutes or more, in usual, depending on the washing conditions. It is also possible to wash in a continuous manner.

Such acid treatment, hydrothermal treatment, or washing with an organic solvent can be combined as appropriate.

Heat Treatment Process

The PPS resin that has undergone the postprocessing process is further subjected to heat treatment so that the molecular chains are crosslinked with each other, thereby obtaining the PPS resin having high mechanical strength and excellent dimensional stability. By using such a heat treatment process, the above-described high-viscosity PPS resin (A-1) can be easily obtained. The heat treatment process will be specifically described hereinafter.

The heat treatment can be performed to obtain the PPS resin having high mechanical strength. However, excessive heat treatment is not preferred because it causes non-filling during molding or the like due to reduced melt fluidity and increased gelled products in the resin. However, too mild heat treatment has little effect on reducing the volatile components, reduces strength of the resin, and tends to reduce antifreeze resistance. The heat treatment can provide the PPS resin with improved mechanical strength while suppressing generation of the gelled product without compromising melt fluidity.

The heat treatment can be performed either in a high-oxygen concentration atmosphere or a low-oxygen concentration atmosphere, as long as the heat treatment temperature and the heat treatment time are set within specific ranges.

As conditions of the high-oxygen concentration atmosphere, the oxygen concentration is preferably more than 2% by volume, and the heat treatment is performed desirably at the temperature of 160 to 270 °C for the heat treatment time of 0.1 to 17 hours. However, under the conditions of the high-oxygen concentration, a rate of reducing the volatile component is fast but, at the same time, oxidative crosslinking progresses rapidly, so that the gelled products are likely to be generated. Therefore, it is generally preferable to perform the heat treatment at a low temperature for a long time or at a high temperature for a short time. Specific conditions for the heat treatment at a low temperature for a long time are preferably at 160 °C or higher and 210 °C or lower for 1 hour or more and 17 hours or less, more preferably at 170 °C or higher and 200 °C or lower for 1 hour or more and 10 hours or less. The heat treatment performed at the heat treatment temperature of lower than 160 °C has little effect on reducing the volatile components and little effect on improving the mechanical strength. In addition, even at a low temperature, the oxidative crosslinking progresses and gelled products are likely to be generated when the heat treatment time exceeds 17 hours under conditions where the oxygen concentration exceeds 2% by volume. Specific conditions for the heat treatment at a high temperature for a short time are preferably higher than 210 °C and 270 °C or lower for 0.1 hours or more and less than 1 hour, more preferably at 220 °C or higher and 260 °C or lower for 0.2 to 0.8 hours. The oxidative crosslinking rapidly progresses and gelled products are likely to be generated when the heat treatment temperature exceeds 270 °C. In addition, even at a high temperature, when the heat treatment time is less than 0.1 hours, the effect of reducing the volatile components is small and the effect of improving the mechanical strength is small.

As conditions of the low-oxygen concentration atmosphere, the oxygen concentration is preferably 2% by volume or less, and the heat treatment temperature is preferably 210 to 270 °C, and the heat treatment time is preferably 0.2 to 50 hours. When the oxygen concentration is low, the effect of reducing volatile components tends to decrease. Therefore, in general, the heat treatment is performed preferably at high temperature for a long time, more preferably under heat treatment temperature condition at 220 °C to 260 °C for 2 to 20 hours. When the heat treatment is less than 210 °C, the amount of the volatile components in the PPS resin does not decrease, and the effect of improving the mechanical strength is small. When the heat treatment time is more than 50 hours, the productivity decreases.

A heating device for the heat treatment may be an ordinary hot-air dryer or a heating device with a rotor or stirring blade. For efficient and more uniform treatment, a heating device with a rotor or stirring blade is more preferably used. Examples include a paddle type dryer, a fluidized bed dryer, a KID dryer, a steam tube dryer, as well as an inclined disc dryer, a hopper dryer, and a vertical agitating dryer. Among them, a paddle type dryer, a fluidized bed dryer, and a KID dryer are preferred for uniform and efficient heating. To adjust the oxygen concentration in the heat treatment, a non-oxidizing inert gas such as nitrogen, argon, helium, or water vapor can be incorporated in an oxidizing gas such as oxygen, air, or ozone without problem. The oxidizing gas and the inert gas can be introduced from whichever position, for example, the top, bottom, or side of the heating device, without particular limitation, as long as the heat treatment can be performed in the heating device. A simpler method is to introduce the gases from the top of the heating device. The oxidizing gas and the inert gas may be mixed before introduction into the heating device, and then introduced in the heating device. Alternatively, the oxidizing gas and the inert gas may be separately incorporated from different positions of the heating device.

Having undergone the heat treatment process, the structure of the PPS resin is considered to have been changed. The PPS resins obtained after undergone the heat treatment have complex and different structures. Therefore, there is a reason why it is impractical to identify the structure of the PPS resin. Undergoing the heat treatment process can remove volatile components and moisture contained in the PPS resin, and the PPS resin excellent in mechanical strength and dimensional stability can be obtained.

Melt flow rate (sometimes "MFR") of the PPS resin obtained through the above-described polymerization reaction process, recovery process, postprocessing process, and, if necessary, heat treatment process is preferably 1000 g/10 min or less.

The PPS resin contains preferably 20% by weight or more, more preferably 50% by weight or more of the PPS resin (A-1) having MFR of 50 to 600 g/10 min where the polyphenylene sulfide resin (A) is 100% by weight, from the viewpoint of improving platability. An MFR of 50 g/10 min or more is preferred without any deterioration in moldability. An MFR of 600 g/10 min or less is preferable because no plating layer is formed or the adhesiveness of the plating layer is not deteriorated. The MFR is more preferably 100 to 500 g/10 min. The MFR is a value measured according to ASTM-D1238-70 under conditions at 315 °C and under a load of 2160 g. Including 50% by weight or more of the high-viscosity PPS resin (A-1) in 100 parts by weight of the polyphenylene sulfide resin (A) is preferable because the platability is further improved. Most preferably, the upper limit of the content of the high-viscosity PPS resin (A-1) in the polyphenylene sulfide resin (A) is 100% by weight. That is, it is most preferable to use the high-viscosity PPS resin (A-1) alone.

The polyphenylene sulfide resin composition contains the fibrous filler (B). Specific example of the fibrous fillers (B) include glass fibers, glass milled fibers, glass flat fibers, modified section glass fibers, glass cut fibers, metal fibers such as stainless-steel fibers, aluminum fibers, and brass fibers, organic fibers such as aromatic polyamide fibers and Kevlar fibril, gypsum fibers, ceramic fibers, asbestos fibers, zirconia fibers, alumina fibers, silica fibers, titanium oxide fibers, and silicon carbide fibers.

It is preferable to use at least one selected from glass fibers, glass milled fibers, glass flat fibers, and modified section glass fibers among the fibrous fillers (B), from the viewpoint of mechanical properties and dimensional properties. The above-described glass fibers and other fillers can be used with their surface treated with known coupling agents (e.g., silane-based coupling agents, titanate-based coupling agents) or other surface treatment.

As for the content of the fibrous filler (B) contained in the polyphenylene sulfide resin composition, it is essential to contain 30 to 200 parts by weight of the fibrous filler (B) with respect to 100 parts by weight of the polyphenylene sulfide resin (A) from the viewpoint of heat resistance and balance of the mechanical properties. The content is more preferably 40 to 150 parts by weight, still more preferably 50 to 110 parts by weight. When the content is less than 30 parts by weight, the coefficient of linear expansion of the PPS resin is higher and difference in linear expansion from that of the metal forming the plating layer is greater, and thus the stress generated during heat cycle is larger. Therefore, the adhesiveness tends to be deteriorated. The content of more than 200 parts by weight will result in excessive surface roughening, so anchor effect during the plating cannot be expected. Therefore, the adhesiveness tends to be deteriorated.

Next, the polyphenylene sulfide resin composition preferably includes a functional group-containing olefinic copolymer (C) (sometimes "functional group-containing olefinic copolymer (C)") which contains at least one functional group selected from a glycidyl group, an acid anhydride group, a carboxyl group and a salt thereof, and an alkoxycarbonyl group. The functional group-containing olefinic copolymer (C) is obtained by introducing monomer components (functional group-containing components) containing functional groups such as glycidyl groups, acid anhydride groups, or ionomers into olefinic polymer and/or olefinic copolymer. Examples of such functional group-containing components include: acid anhydride group-containing monomers such as maleic anhydride, itaconic anhydride, citraconic anhydride, endo-bicyclo[2.2.1]5-heptene-2,3-dicarboxylic acid, and endo-bicyclo-[2.2.1]5-heptene-2,3-dicarboxylic anhydride, glycidyl group-containing monomers such as glycidyl acrylate, glycidyl methacrylate, glycidyl ethacrylate, glycidyl itaconate, and glycidyl citraconate, and ionomer-containing monomers such as carboxylic acid metal complex.

Types of the olefinic copolymers include olefinic copolymer include (co)polymers obtained by polymerizing α-olefin such as ethylene, propylene, butene-1, pentene-1, octene-1,4-methylpentene-1, and isobutylene alone or two or more of them, and copolymers of α-olefin and α,β-unsaturated acid and alkyl ester thereof such as acrylic acid, methyl acrylate, ethyl acrylate, butyl acrylate, methacrylic acid, methyl methacrylate, ethyl methacrylate, butyl methacrylate. Specific examples include ethylene/propylene copolymer ("A/B" indicates a copolymer of A and B, the same applies hereafter), ethylene/butene-1 copolymer, ethylene/hexene-1 copolymer, ethylene/octene-1 copolymer, ethylene/methyl acrylate copolymer, ethylene/ethyl acrylate copolymer, ethylene/butyl acrylate copolymer, ethylene/methyl methacrylate copolymer, ethylene/ethyl methacrylate copolymer, and ethylene/butyl methacrylate copolymer. It is preferable to include the glycidyl group among the functional groups from the viewpoint of improving platability.

There is no limitation on the method of introducing the functional group-containing components into the olefinic copolymer. A method in which the functional group-containing components are copolymerized at the time of copolymerization of olefinic (co)polymers similar to those used as the above-described olefinic (co)polymers or introduced into the olefinic (co)polymer by graft copolymerization using radical initiators can be used. As a specific example of the olefin (co)polymer obtained by introducing monomer components having functional groups such as glycidyl group, acid anhydride group, ionomer into a particularly useful olefin polymer, ethylene/propylene-g-glycidyl methacrylate copolymer ("g" means graft, the same applies hereinafter), ethylene/butene-1-g-glycidyl methacrylate copolymer, ethylene/glycidyl acrylate copolymer, ethylene/glycidyl methacrylate copolymer, ethylene/methyl acrylate/glycidyl methacrylate copolymer, ethylene/methyl methacrylate/glycidyl methacrylate copolymer, ethylene/propylene-g-maleic anhydride copolymer, ethylene/butene-1-g-maleic anhydride copolymer, ethylene/methyl acrylate-g-maleic anhydride copolymer, ethylene/ethyl acrylate-g-maleic anhydride copolymer, ethylene/methyl methacrylate-g-maleic anhydride copolymer, ethylene/ethyl methacrylate-g-maleic anhydride copolymer, a zinc complex of ethylene/methacrylic acid copolymer, a magnesium complex of ethylene/methacrylic acid copolymer, a sodium complex of ethylene/methacrylic acid copolymer, or glycidyl ester of α-olefin such as ethylene, propylene and α,β-unsaturated acid can be suitably used. As the functional group-containing component, a glycidyl group is most preferable. The glycidyl group concentration is appropriately in a range of 1.0 to 4.0% by weight, preferably in a range of 1.1 to 3.9% by weight. The glycidyl group concentration in the functional group-containing olefinic copolymer (C) is calculated according to equation (1) below.

When the concentration is 1.0% by weight or more, the compatibility with the PPS resin is good and the mechanical properties is increased.

When the concentration is 4.0% by weight or less, the adhesiveness of the plating layer is improved.

$$\text{Glycidyl group concentration (\% by weight)} = A \times A_M / \text{Gly}_M \quad \text{Equation (1)}$$

wherein

A [% by weight]: Content of glycidyl group-containing component in functional group-containing olefinic copolymer $A_M$ [g/mol]: Molecular weight of glycidyl group-containing component $Gly_M$ [g/mol]: Molecular weight of glycidyl group (43 g/mol).

The glycidyl group-containing component refers to a repeating unit containing a glycidyl group among the repeating units constituting the functional group-containing olefinic copolymer (C).

It is preferable to contain 1 to 30 parts by weight of the functional group-containing olefinic copolymer (C) with respect to 100 parts by weight of the polyphenylene sulfide resin (A). By setting the content to 1 parts by weight or more, the adhesiveness of the plating layer is improved, and by setting the content to 30 parts by weight or less, deposit on the mold during the injection molding can be suppressed, and the deterioration of appearance of the product due to the gas generated by decomposition does not occur, which is preferable.

Furthermore, the polyphenylene sulfide resin composition may contain the non-fibrous inorganic filler (D) as required. Examples of the non-fibrous inorganic filler (D) include E glass (plate, scaly, granular, amorphous, crushed), H glass (plate, scaly, granular, amorphous, crushed), A glass (plate, scaly, granular, amorphous, crushed), C glass (plate, scaly, granular, amorphous, crushed), natural quartz glass (plate, scaly, granular, amorphous, crushed), synthetic quartz glass (plate, scaly, granular, amorphous, crushed), talc, kaolin, silica (crushed, spherical), quartz, carbonic acid calcium, carbonic acid zinc, mica, glass beads, glass flakes, crushed, amorphous glass, glass microballoon, clay, molybdenum disulfide, aluminum oxide (crushed), translucent alumina (plate, scaly, granular, amorphous, crushed), metal oxide such as titanium oxide (crushed), zinc oxide (plate, scaly, granular, amorphous, crushed), metal hydroxide such as aluminum hydroxide (plate, scaly, granular, amorphous, crushed), aluminum nitride, translucent aluminum nitride (plate, scaly, granular, amorphous, crushed), calcium polyphosphate, metallic powder, metallic flake, metallic ribbon, metal oxide. Specific examples of the metallic species of the metallic powder, metallic flake, and metallic ribbon include silver, nickel, copper, zinc, aluminum, stainless-steel, iron, brass, chromium, and tin. In particular, from the viewpoint of mechanical properties and dimensional properties, it is preferable to contain at least one selected from talc, kaolin, silica, carbonic acid calcium, glass beads, glass flakes.

The content of the non-fibrous inorganic filler (D) is 0.5 to 60 parts by weight, preferably 0.5 to 35 parts by weight, more preferably 0.5 to 25 parts by weight with respect to 100 parts by weight of the polyphenylene sulfide resin (A) from the viewpoint of plating adhesiveness, heat resistance, and balance of mechanical properties. By setting the content to 0.5 parts by weight or more, the surface roughness required for plating can be obtained. By setting the content to 60 parts by weight or less, the surface is not roughened any more than necessary upon chemical processing during the plating process, and the adhesiveness of the plating layer can be maintained.

It is preferable that a ratio Y/X of the compounding weight X of the non-fibrous inorganic filler (D) to the compounding weight Y of the fibrous filler (B) with respect to 100 parts by weight of the polyphenylene sulfide resin (A) is 2 or more, preferably 3 or more. When the ratio is 2 or more, the surface is not roughened any more than necessary upon chemical processing during the plating process, and the adhesiveness of the plating layer can be maintained.

The PPS resin composition may contain a copolymer (E) of ethylene and α-olefin having 3 to 12 carbon atoms, which does not contain functional group selected from a glycidyl group, an acid anhydride group, a carboxyl group and a salt thereof, and an alkoxycarbonyl group (sometimes "olefinic copolymer containing no functional group (E)") as long as the effect is not impaired. Examples of the α-olefin having 3 to 12 carbon atoms include propylene, butene-1, pentene-1, octene-1, 4-methylpentene-1, and isobutylene. The α-olefin having 3 to 12 carbon atoms may be a (co)polymer obtained by polymerization of α-olefin alone or two or more of them.

The content of the olefinic copolymer containing no functional group (E) is preferably 1 to 3 parts by weight, particularly preferably 0 to 1.5 parts by weight with respect to 100 parts by weight of the polyphenylene sulfide resin (A). Adding 1 parts by weight or more is preferable, because heat cycle resistance is remarkably improved. Setting to 3 parts by weight is preferable, because dimensional stability can be maintained while improving heat cycle resistance.

The polyphenylene sulfide resin composition may contain an alkoxysilane compound (F) (sometimes "silane compound (F)") having at least one functional group selected from an epoxy group, an amino group, an isocyanate group, a hydroxyl group, a mercapto group, and an ureido group, as long as the desired effect is not impaired.

The content of the silane compound (F) is preferably 0.1 to 3 parts by weight of the silane compound (F) with respect to 100 parts by weight of the polyphenylene sulfide resin (A). By setting in such a range, both of excellent fluidity and weld strength can be achieved.

Furthermore, as the polyphenylene sulfide resin composition, resins other than the polyphenylene sulfide resin (A), the functional group-containing olefinic copolymer (C), and the olefinic copolymer containing no functional group (E) can be blended and used as long as the effect is not impaired. The resins that can be blended are not particularly limited, and specific examples thereof include polyamide-based resins such as nylon 6, nylon 66, nylon 610, nylon 11, nylon 12, and aromatic nylon, polyester resins such as polyethylene terephthalate, polybutylene terephthalate, polycyclohexyldimethylene terephthalate, polynaphthalene terephthalate, polyamideimide, polyacetal, polyimide, polyetherimide, polyethersulfone, modified polyphenylene ether resin, polysulfone resin, polyallyl sulfone resin, polyketone resin, polyarylate resin, liquid crystal polymer, polyether ketone resin, polythioether ketone resin, polyether ether ketone resin, and polyethylene tetrafluoride resin.

To the polyphenylene sulfide resin composition, other components, for example, an ordinary additive such as an antioxidant or a heat resistant stabilizer (hindered phenol-based, hydroquinone-based, phosphorus-based, phosphite-based, amine-based, sulfur-based, and substitutes thereof), an antiweathering agent (resorcinol-based, salicylate-based, benzotriazole-based, benzophenone-based, hindered amine-based or the like), a release agent and a lubricant (montanic acid and a metal salt thereof, ester thereof, half ester thereof, stearyrl alcohol, stearamide, stearate, bis-urea and polyethylene wax or the like), a pigment (cadmium sulfide, phthalocyanine, carbon black for coloring and the like), a dye (Nigrosine or the like), a nucleating agent (an inorganic nucleating agent such as talc, silica, kaoline, clay, or an organic nucleating agent), a plasticizers (octyl p-oxybenzoate, N-butylbenzenesulfonamide or the like), an antistatic agent (an alkylsulfate type anionic antistatic agent, a quaternary ammonium salt type cationic antistatic agent, a nonionic antistatic agent such as polyoxyethylene sorbitan monostearate, a betaine-based amphoteric antistatic agent and the like), a flame retardant (e.g., red phosphorus, phosphate ester, melamine cyanurate, hydroxides such as magnesium hydroxide and aluminum hydroxide, ammonium polyphosphate, brominated polystyrene, brominated polyphenylene ether, brominated polycarbonate, brominated epoxy resin, or a combination of such a brominated flame retardant and antimony trioxide or the like), a heat stabilizer, a lubricant such as calcium stearate, aluminum stearate, and lithium stearate, a strength improving material such as novolac phenol type epoxy resin, and a cresol novolac type epoxy resin, a UV inhibitor, a colorant, a flame retardant or a foaming agent can be added as long as the effect is not impaired. The type of the crystal nucleating agent is not particularly limited, and examples thereof include inorganic crystal nucleating agents and organic crystal nucleating agents.

The method of preparing the polyphenylene sulfide resin composition is not particularly limited. In a representative example of the method, each raw material is supplied to a commonly known melt mixer such as a single screw or twin screw extruder, a Banbury mixer, a kneader, and a mixing roll, and kneaded at a temperature of 280 to 380 °C. The order of mixing the raw materials is not particularly limited, and any of the following methods may be used: a method in which all of the raw materials are compounded, and then melt-kneaded by the above-described method; a method in which some of the raw materials are blended, then melt-kneaded by the above-described method, compounded with the remaining raw materials, and further melt-kneaded; or a method in which some of the raw materials are compounded, and then the remaining raw materials are mixed using a side feeder during melt-kneading with a single-screw or twin-screw extruder. Of course, additive components to be added in a small amount can be added after the other components are kneaded and pelletized by the above-described method, and then subjected to molding.

The polyphenylene sulfide resin composition obtained as described above can be subjected to various molding such as injection molding, extrusion molding, blow molding, and transfer molding, and is particularly suitable for injection molding applications.

The plating layer is formed on the molding molded with the polyphenylene sulfide resin composition to obtain a plated molding having a plating layer formed on a part of the surface of the molding. An example in which the plating layer is formed on the entire surface of the molding is included. A plating technique used will be described. A general electroless plating process for the resin molding includes performing a surface treatment process, a catalyst application process, an activation process, and plating process. In the plating process, electroless nickel plating, and electroplating are generally performed.

Examples of the surface treatment process include a surface activation process and/or a surface roughening process.

Regarding the surface roughening process, the technique of roughening the surface of the resin molding may be any of chemical, mechanical, and physical techniques. Since the PPS resin is excellent in chemical resistance as described above, it is often the chemical technique cannot always provide sufficient roughening. In such situations, a mechanical or physical roughening method is preferred. A method using, for example, a sandpaper to roughen the surface of the resin molding may be used. However, sandblasting, shotblasting, liquid honing, tumbling, laser radiation and the like, which are excellent in roughening efficiency, industrial mass productivity, and quality stability, are preferred. However, these techniques may provide insufficient roughening for complicated shape, and further roughen the surface more than necessary, which may impair smoothness. The most preferred surface treatment process is a method performed in the following procedure:

(a) irradiating the surface of the molding from a position of 5 to 200 mm away from the surface with an ultraviolet light having a dominant wavelength in the wavelength range of 100 to 400 nm for 10 to 120 minutes; and (b) subsequently immersing the molding processed in (a) in an alkaline aqueous solution with a concentration of 5 to 40% by weight for 1 to 30 minutes.

The ultraviolet light irradiation position less than 5 mm from the surface of the molding will result in surface deterioration due to excessive surface activation. The ultraviolet light irradiation position more than 200 mm will result in insufficiently activated surface of the molding due to weak radiation intensity. By setting the irradiation time to 10 minutes or more, the surface is activated, and sufficient adhesiveness of the plating layer can be obtained. Setting the irradiation time to 120 minutes or less does not deteriorate the PPS resin surface, which is preferable. The type of the alkaline aqueous solution is not particularly limited, but preferably is an aqueous alkaline metal solution selected from an aqueous sodium hydroxide solution, an aqueous potassium hydroxide solution, an aqueous lithium hydroxide solution, an aqueous rubinium hydroxide solution, an aqueous cesium hydroxide solution, and tetraalkylammonium hydroxide aqueous solution, more preferably an aqueous solution selected from an aqueous potassium hydroxide solution and an aqueous sodium hydroxide aqueous solution. The concentration of the alkaline aqueous solution is set to 5% by weight or more so as to sufficiently roughen the surface. The concentration is set to 40% by weight or less, so that the surface is not excessively roughened. The temperature of the alkaline aqueous solution is preferably 40 to 80 °C. The temperature is set to 40 °C or more to sufficiently roughen the surface, while the temperature is set to 80 °C or lower not to excessively roughen the surface. By immersing for one minute or more, the surface can be sufficiently roughened, and by immersing for 30 minutes or less, the surface is not excessively roughened.

The surface of the molding obtained in the surface treatment process preferably has pores with a of diameter of 0.01 to 2 μm, preferably 0.01~1 μm as observed with a scanning electron microscope. Having pores of 0.01 μm or more is preferable because physical adhesiveness (anchor effect) and sufficient adhesiveness of the plating layer can be developed. Having pores of 2 μm or less is preferable because surface roughening can be suppressed.

Next, the process of adsorbing a catalyst metal precursor to the molding obtained in the surface treatment process (catalyst application process), and the process of reducing the catalyst metal precursor to metal (activation process) may be general techniques. In an example, 0.1 to 0.5 $g/dm^3$ of an aqueous palladium dichloride solution as a catalyst solution is applied to the roughened surface of the molding, and 15 to 25 $g/dm^3$ of an aqueous sodium phosphinate solution is used to reduce palladium dichloride on the surface of the PPS resin to metal. Such a technique forms metallic nuclei for smooth deposition of the electroless NiP plating.

Next, a plating process is performed using the molding having palladium metal deposited on its surface, which is obtained in the above-described process. In this plating process, chemical copper plating, chemical nickel plating, and the like are used. Thereafter, electroplating can be further applied to perform bright nickel plating or sulfuric acid copper plating. From the viewpoint of electromagnetic shielding properties, copper plating is particularly useful.

The plating layer in the plated molding obtained in the above-described process is characterized by having the arithmetic mean roughness Ra of 1.5 μm or less as measured by the method according to JIS-B-0601. Ra is preferably 1.0 μm or less, more preferably 0.5 μm or less. Ra of more than 1.5 μm is not preferable because it is difficult to selectively remove the frequency of electromagnetic waves at the time of electromagnetic shielding properties. The smaller lower limit of the arithmetic mean roughness Ra is more preferable. Realistically, it is 0.01 μm or more.

The plated molding enables a plating layer having excellent surface smoothness to be formed without compromising the various properties inherent in PPS resins. Such a molding is applicable to electrical and electronic components because of its excellent electromagnetic shielding properties and surface thermal conductivity due to the plating layer. Particularly, mutual interference by electromagnetic wave can be prevented. From the above-described properties, the plated molding is preferably applied to housings of sensor components and housings of ECU (Electronic Control Unit) components.

Examples of other applicable use of the molding made of the polyphenylene sulfide resin composition include: electric and electronic components represented by sensors, LED lamps, connectors for consumer use, sockets, resistors, relay cases, switches, coil bobbins, capacitors, variable condenser cases, vibrators, various terminal boards, transformers, plugs, printed boards, tuners, loudspeakers, microphones, headphones, compact motors, magnetic head bases, semiconductors, liquid crystals, FDD (Floppy Disk Drive) carriages, FDD chassis, motor brush holders, parabola antenna, computer-related components; and the molding can also be applicable to VTR (Video Tape Recorder) components, TV components, irons, hair dryers, rice cooker components, microwave oven components, audio equipment components such as acoustic components, audio, LaserDisc (trade name), compact disc, the household appliance and the office supplies represented by illumination components, refrigerator components, air conditioner components, typewriter components, word processor components. Other examples include various applications such as office computer-related components, telephone-related components, fax machine-related components, copy machine-related components, jigs for cleaning, motor components, machinery-related components represented by lighters and typewriter; optical apparatus, accurate instrument-related components represented by microscope, binoculars, cameras, clocks; server-related components used for communication device-related application, small cell-related components, radio wave denoising-related components: automobile/vehicle-related components such as valve alternator terminals, alternator connectors, IC regulators, potentiometers for light diya, various valves such as effluent gas valve, fuel-related/exhaust-system/inlet-system pipes, air-intake nozzle snorkel, intake manifold, fuel pump, effluent gas sensor, cooling water sensor, oil temperature sensor, throttle position sensor, crankshaft position sensor, brake pad wear sensor, thermostat base for air conditioner, air conditioner panel switch boards, connectors for fuse, horn terminal, electrical component dielectric plates, lamp-sockets, lamp reflectors, lamp housings, ignition device cases, car speed sensors, cable liners.

EXAMPLES

Examples will be given below to describe moldings, methods and housing components more specifically, but this disclosure should not be construed as limited to the description of the examples.

Method of Evaluating Produced PPS Resin (1) Melt flow rate (MFR)

The measurement was performed according to ASTM-D1238-70 at the measurement temperature of 315 °C under a load of 2160 g.

However, for the polyphenylene sulfide resin with low viscosity, the MFR was calculated by the following method. The polyphenylene sulfide resin was measured for ER according to ASTM-D1238-70 at the temperature of 315.5 °C under a load of 345 g, and the MFR value was calculated by equation (2):

$$MFR=15.8\times4.4\times ER \quad \text{Equation (2)}$$

Reference Example 1 Polymerization of PPS (PPS-1)

8.27 kg (70.00 mol) of 47.5% sodium hydrosulphide, 2.91 kg (69.80 mol) of 96% sodium hydroxide, 11.45 kg (115.50 mol) of N-methyl-2-pyrrolidone (NMP), and 10.5 kg of ion exchanged water were charged in a 70 L autoclave equipped with a stirrer and a bottom plug valve, gradually heated to 245 °C over about 3 hours while passing nitrogen under ordinary pressure, 14.78 kg of water and 0.28 kg of NMP were distilled off, and then the reaction vessel was cooled to 200 °C.

The amount of water remaining in the system per mole of the prepared alkali metal sulfide was 1.06 moles including the water consumed in the hydrolysis of NMP. The amount of scattered hydrogen sulfide was 0.02 mole per mole of the prepared alkali metal sulfide. Then, after cooling to 200 °C and adding 10.48 kg (71.27 mol) of p-dichlorobenzene and 9.37 kg (94.50 mol) of NMP, the reaction vessel was sealed under nitrogen gas, and heated from 200 °C to 270 °C at a rate of 0.6 °C/min while stirring at 240 rpm. After reacting at 270 °C for 100 minutes, the bottom plug valve of the autoclave was opened, the contents was flashed into a vessel equipped with a stirrer for 15 minutes while pressurized with nitrogen, and stirred at 250 °C for a while to remove most of NMP.

The resulting solid and 76 liters of ion exchanged water were placed in an autoclave equipped with a stirrer, washed at 70 °C for 30 minutes, and then suction filtered through a glass filter. Then, 76 liters of ion exchanged water heated to 70 °C was poured in a glass filter and suction filtered to obtain a cake.

The resulting cake and 90 liters of ion exchanged water were charged in an autoclave equipped with a stirrer, and acetic acid was added to pH 7. After the inside of the autoclave was replaced with nitrogen, the temperature was raised to 192 °C and held for 30 minutes. The autoclave was then cooled, and the contents were removed.

The contents were suction filtered through a glass filter, then 76 liters of ion exchanged water at 70 °C was poured therein and suction filtered to obtain a cake. The resulting cake was dried at 120 °C under a nitrogen gas stream to obtain dried PPS. The dried PPS was heat treated at 200 °C under an oxygen gas stream until the MFR value reached 150 g/10 min to obtain crosslinked PPS-1. The MFR value of the resulting polymer was 130 g/10 min.

Reference Example 2 Polymerization of PPS (PPS-2)

8.27 kg (70.00 mol) of 47.5% sodium hydrosulphide, 2.94 kg (70.63 mol) of 96% sodium hydroxide, 11.45 kg (115.50 mol) of N-methyl-2-pyrrolidone (NMP), 1.89 kg (23.1 mol) of sodium acetate, and 5.50 kg of ion exchanged water were charged in a 70 L autoclave equipped with a stirrer and a bottom plug valve, gradually heated to 245 °C over about 3 hours while passing nitrogen under ordinary pressure, 9.77 kg of water and 0.28 kg of NMP were distilled off, and then the reaction vessel was cooled to 200 °C. The amount of water remaining in the system per mole of the prepared alkali metal sulfide was 1.06 moles including the water consumed in the hydrolysis of NMP. The amount of scattered hydrogen sulfide was 0.02 mole per mole of the prepared alkali metal sulfide.

Then, after cooling to 200 °C and adding 10.42 kg (70.86 mol) of p-dichlorobenzene and 9.37 kg (94.50 mol) of NMP, the reaction vessel was sealed under nitrogen gas, heated from 200 °C to 270 °C at a rate of 0.6 °C/min while stirring at 240 rpm, and reacted at 270 °C for 140 minutes. Then, 2.40 kg (133 moles) of water was injected under pressure while cooling from 270 °C to 250 °C over 15 minutes. After gradually cooling from 250 °C to 220 °C over 75 minutes and then rapidly cooling to about room temperature, the contents were removed.

The contents were diluted with about 35 liters of NMP and stirred as a slurry at 85 °C for 30 minutes, then filtered through an 80-mesh wire gauze (aperture, 0.175 mm) to obtain a solid. The resulting solid was washed and filtered with about 35 liters of NMP in the same manner. The resulting solid was diluted with 70 liters of ion exchanged water, stirred at 70 °C for 30 minutes, and then filtered through an 80-mesh wire gauze to recover solid, an operation was repeated three times in total. The resulting solid and 32 g of acetic acid were diluted with 70 liters of ion exchanged water, stirred at 70 °C for 30 minutes, then filtered through an 80-mesh wire gauze, and the resulting solid was further diluted with 70 liters of ion exchanged water, stirred at 70 °C for 30 minutes, and filtered through an 80-mesh wire gauze to recover solid. The solid obtained as described above was dried at 120 °C under a nitrogen gas stream to obtain dried PPS-2. The MFR value of the resulting polymer was 300 g/10 min.

Reference Example 3 Polymerization of PPS (PPS-3)

8267.4 g (70.0 mol) of 47.5% sodium hydrosulphide, 2925.0 g (70.2 mol) of 96% sodium hydroxide, 13860.0 g (140.0 mol) of N-methyl-2-pyrrolidone (NMP), 1894.2 g (23.1 mol) of sodium acetate, and 10500.0 g of ion exchanged water were charged in an autoclave equipped with a stirrer and a valve at its bottom, gradually heated to 240 °C over about 3 hours while passing nitrogen under ordinary pressure, 14772.1 g of water and 280.0 g of NMP were distilled off, and then the reaction vessel was cooled to 160 °C. The amount of water remaining in the system per mole of the prepared alkali metal sulfide was 1.08 moles including the water consumed in the hydrolysis of NMP. The amount of scattered hydrogen sulfide was 0.023 mole per mole of the prepared alkali metal sulfide.

Next, 10646.7 g (72.4 mol) of p-dichlorobenzene(p-DCB) and 6444.9 g (65.1 mol) of NMP were added, and the reaction vessel was sealed under nitrogen gas, heated from 200 °C to 270 °C at a rate of 0.6 °C/min while stirring at 240 rpm, and held at 270 °C for 70 minutes. The extraction valve at the bottom of the autoclave was opened, and the contents were flashed into a vessel equipped with a stirrer while pressurized with nitrogen for 15 minutes and stirred at 250 °C for a while to remove most of the NMP.

The resulting solid and 53 liters of ion exchanged water were placed in an autoclave equipped with a stirrer, washed at 70 °C for 30 minutes, and then suction filtered through a glass filter with a pore size of 10 to 16 μm. Then, 60 liters of ion exchanged water heated to 70 °C was poured in a glass filter with a pore size of 10 to 16 μm and suction filtered to obtain 18000 g of a PPS resin cake (including 7550 g of the PPS resin).

18,000 g of the above-described PPS resin cake, 40 liters of ion exchanged water, and 43 g of acetic acid were charged in an autoclave with a stirrer, the inside of the autoclave was replaced with nitrogen, and the temperature was raised to 192 °C and held for 30 minutes to perform acid treatment. The pH during the acid treatment was 7. After cooling the autoclave, the contents were filtered through a glass filter with a pore size of 10 to 16 μm. Then, 60 liters of ion exchanged water heated to 70 °C was poured in a glass filter and suction filtered to obtain a cake. The resulting cake was dried at 120 °C under a nitrogen gas stream for 4 hours to obtain acid-treated linear PPS. The linear PPS was placed in a heating device having a volume of 100 liters, equipped with a stirrer, and thermally oxidized at 220 °C and 2% oxygen concentration for 2 hours to obtain crosslinked PPS-3. The MFR value of the resulting polymer was 5000 g/10 min.

Reference Example 4 Polymerization of PPS (PPS-4)

8267.4 g (70.0 mol) of 47.5% sodium hydrosulphide, 2925.0 g (70.2 mol) of 96% sodium hydroxide, 13860.0 g (140.0 mol) of N-methyl-2-pyrrolidone (NMP), 1894.2 g (23.1 mol) of sodium acetate, and 10500.0 g of ion exchanged water were charged in an autoclave equipped with a stirrer and a valve at its bottom, gradually heated to 240 °C over about 3 hours while passing nitrogen under ordinary pressure, 14772.1 g of water and 280.0 g of NMP were distilled off, and then the reaction vessel was cooled to 160 °C. The amount of water remaining in the system per mole of the prepared alkali metal sulfide was 1.08 moles including the water consumed in the hydrolysis of NMP. The amount of scattered hydrogen sulfide was 0.023 mole per mole of the prepared alkali metal sulfide.

Next, 10646.7 g (72.4 mol) of p-dichlorobenzene(p-DCB) and 6444.9 g (65.1 mol) of NMP were added, and the reaction vessel was sealed under nitrogen gas, heated from 200 °C to 270 °C at a rate of 0.6 °C/min while stirring at 240 rpm, and held at 270 °C for 70 minutes. The extraction valve at the bottom of the autoclave was opened, and the contents were flashed into a vessel equipped with a stirrer while pressurized with nitrogen for 15 minutes and stirred at 250 °C for a while to remove most of the NMP.

The resulting solid and 53 liters of ion exchanged water were placed in an autoclave equipped with a stirrer, washed at 70 °C for 30 minutes, and then suction filtered through a glass filter with a pore size of 10 to 16 μm. Then, 60 liters of ion exchanged water heated to 70 °C was poured in a glass filter with a pore size of 10 to 16 μm and suction filtered to obtain 18000 g of a PPS resin cake (including 7550 g of the PPS resin).

18,000 g of the above-described PPS resin cake, 40 liters of ion exchanged water, and 43 g of acetic acid were charged in an autoclave with a stirrer, the inside of the autoclave was replaced with nitrogen, and the temperature was raised to 192 °C and held for 30 minutes to perform acid treatment. The pH during the acid treatment was 7. After cooling the autoclave, the contents were filtered through a glass filter with a pore size of 10 to 16 μm. Then, 60 liters of ion exchanged water heated to 70 °C was poured in a glass filter and suction filtered to obtain a cake. The resulting cake was dried at 120 °C under a nitrogen gas stream for 4 hours to obtain acid-treated linear PPS-4. The MFR value of the resulting polymer was 6300 g/10 min.

Reference Example 5 Polymerization of PPS (PPS-5)

8.27 kg (70.00 mol) of 47.5% sodium hydrosulphide, 2.91 kg (69.80 mol) of 96% sodium hydroxide, 11.45 kg (115.50 mol) of N-methyl-2-pyrrolidone (NMP), and 10.5 kg of ion exchanged water were charged in a 70 L autoclave equipped with a stirrer and a bottom plug valve, gradually heated to 245 °C over about 3 hours while passing nitrogen under ordinary pressure, 14.78 kg of water and 0.28 kg of NMP were distilled off, and then the reaction vessel was cooled to 200 °C. The amount of water remaining in the system per mole of the prepared alkali metal sulfide was 1.06 moles including the water consumed in the hydrolysis of NMP. The amount of scattered hydrogen sulfide was 0.02 mole per mole of the prepared alkali metal sulfide.

Then, after cooling to 200 °C and adding 10.48 kg (71.27 mol) of p-dichlorobenzene and 9.37 kg (94.50 mol) of NMP, the reaction vessel was sealed under nitrogen gas, and heated from 200 °C to 270 °C at a rate of 0.6 °C/min while stirring at 240 rpm. After reacting at 270 °C for 100 minutes, the bottom plug valve of the autoclave was opened, the contents was flashed into a vessel equipped with a stirrer for 15 minutes while pressurized with nitrogen, and stirred at 250 °C for a while to remove most of NMP.

The resulting solid and 76 liters of ion exchanged water were placed in an autoclave equipped with a stirrer, washed at 70 °C for 30 minutes, and then suction filtered through a glass filter. Then, 76 liters of ion exchanged water heated to 70 °C was poured in a glass filter and suction filtered to obtain a cake.

The resulting cake and 90 liters of ion exchanged water were charged in an autoclave equipped with a stirrer, and acetic acid was added to pH 7. After the inside of the autoclave was replaced with nitrogen, the temperature was raised to 192 °C and held for 30 minutes. The autoclave was then cooled, and the contents were removed.

The contents were suction filtered through a glass filter, then 76 liters of ion exchanged water at 70 °C was poured therein and suction filtered to obtain a cake. The resulting cake was dried at 120 °C under a nitrogen gas stream to obtain dried PPS-4. The resulting PPS-5 had ER of 90 g/10 min, which was 6257 g/10 min in terms of MFR.

Examples 1 to 13, Comparative Examples 1 to 6

Using a twin screw extruder (TEM-26 manufactured by TOSHIBA MACHINE Co., Ltd.) having an intermediate addition port with a diameter of 26 mm, which is set to a cylinder temperature of 320 °C and a screw speed of 400 rpm, a polyphenylene sulfide resin (A), a functional group-containing olefinic copolymer (C), and a non-fibrous inorganic filler (D), using the PPS resin obtained in Reference Examples 1 to 6, at a weight ratio described for each of Examples and Comparative Examples, as shown in Tables 1 and 2, were added through a raw material supply port and molten, then a fibrous filler (B) was supplied through the intermediate addition port, and melt-kneaded at a discharge rate of 30 kg/hr to obtain pellets. These pellets were used to evaluate properties. The results are shown in Tables 1 and 2.

Method of Forming Plating Layer

A plating layer was formed on the molding by the method described below, and its characteristics were measured.

Surface Treatment Process: Method 1

The molding was irradiated for 60 minutes with ultraviolet light having wavelengths of 184.9 nm and 253.7 nm as dominant wavelengths from a height of 30 mm from the surface of the molding, and then immersed in an aqueous potassium hydroxide solution having a concentration of 20 mass % at 60 °C for 5 minutes.

Surface Treatment Process: Method 2

The molding was immersed in a mixed solution of 67.5 mass % of concentrated nitric acid and 145 g/L of ammonium hydrogen fluoride at 40 °C for 8 minutes, followed by neutralization with a 20 g/L aqueous sodium hydroxide solution.

Catalyst Application Process to Plating Process

The molding obtained in the surface treatment process, surface of which was roughened was immersed in CC-231 (Rhom and Hass), which had been adjusted to 10% by volume, at 45 °C for 2 minutes to condition the surface, and then a 0.3 $g/dm^3$ aqueous palladium dichloride solution as the catalyst solution was applied on the molding surface which had been roughened by immersing at 45 °C for 2 minutes. After that, the PPS resin was immersed in a 19 $g/dm^3$ aqueous sodium phosphinate solution at 45 °C for 2 minutes to reduce palladium dichloride on the surface of the PPS resin to metal (catalyst application process and activation process).

Next, the molding obtained in the above-described process having metal palladium deposited on the surface thereof was subjected to chemical copper plating and further to electroplating to perform bright nickel plating.

Raw materials are shown below.

(A) Polyphenylene Sulfide Resin
- PPS-1: PPS Resin polymerized according to method described in Reference Example 1
- PPS-2: PPS Resin polymerized according to method described in Reference Example 2
- PPS-3: PPS Resin polymerized according to method described in Reference Example 3
- PPS-4: PPS Resin polymerized according to method described in Reference Example 4
- PPS-5: PPS Resin polymerized according to method described in Reference Example 5

(B) Fibrous Filler
- B-1: Chopped strand (T-760H manufactured by Nippon Electric Glass Co., Ltd.; average fiber diameter, 10.5 μm)
- B-2: Chopped strand (T-747N manufactured by Nippon Electric Glass Co., Ltd.; average fiber diameter, 17.0 μm)

(C) Functional Group-Containing Olefinic Copolymer
- C-1: Epoxy group-containing polyolefin (BONDFAST E manufactured by Mitsui Chemicals, Inc.; glycidyl group concentration, 3.63% by weight)
- C-2: Epoxy group-containing polyolefin (BONDFAST 7M manufactured by Mitsui Chemicals, Inc.; glycidyl group concentration, 1.81% by weight)
- C-3: Epoxy group-containing polyolefin (LOTADER AX8750 manufactured by SK Chemical Polymer; glycidyl group concentration, 1.51% by weight)
- C-4: Hydrogenated styrene-based thermoplastic elastomer (Tuftec MP10 manufactured by ASAHI KASEI Corp.; Reactive functional group: amide group)
- C-5: Hydrogenated styrene-based thermoplastic elastomer (Tuftec M1913 manufactured by ASAHI KASEI Corp.; Reactive functional group: acid anhydride group)

(D) Non-Fibrous Inorganic Filler
- D-1: Heavy calcium carbonate (KS S1000 manufactured by CALFINE Co., Ltd.)
- D-2: Heavy calcium carbonate (#800 manufactured by SANKYO SEIFUN K.K.)
- D-3: Heavy calcium carbonate (SUPER S manufactured by Maruo Calcium CO., Ltd.)
- D-4: Magnesium hydroxide (KISUMA 5P manufactured by Kyowa Chemical Industry Co., Ltd.)

(E) Olefinic Copolymer Containing No Functional Group
- E-1: Olefin copolymer (Engage 8842 manufactured by The Dow Chemical Company)

Moldings and plated moldings including the resin compositions were evaluated by the measurement method shown below.

(1) Pore Size

The surface of the molding after the surface treatment process was observed with a scanning electron microscope (JSM-IT100) manufactured by JEOL Ltd. A secondary electron image was observed at 5000-fold magnification, and the obtained image was checked for the presence of pores with a diameter of 2 μm or less.

(2) Surface Roughness

The surface of the plated molding was measured using a surface roughness measuring machine (SV-2100) manufactured by Mitutoyo Corporation, by a method according to JIS-B-0601 to determine the arithmetic mean roughness Ra. The molding in which the plating layer itself was not formed and the molding in which the plating layer was formed but lifted, making it difficult to measure the surface roughness are represented by "–".

(3) Tensile Strength

The tensile strength of the molding including the resin composition was measured according to ISO 527-1, 2(2012). Specifically, measurement was made as follows. Pellets of the polyphenylene sulfide resin composition were dried at 130 °C for 3 hours using a hot-air dryer, then supplied to an injection molding machine (SE-50D) manufactured by Sumitomo Heavy Industries, Ltd., which was set to a cylinder temperature of 310 °C and a mold temperature of 145 °C, and injection molding was performed using a mold having a type A1 test piece shape (thickness, 4 mm) specified in ISO 20753 (2008) under condition such that an average speed of the molten resin which passed through the cross-section area of the central parallel portion was 400±50 mm/s to obtain a test piece. The test piece was conditioned at 23 °C, relative humidity of 50% for 16 hours. Then, tensile strength was measured according to ISO 527-1, -2 (2012) in an atmosphere at 23 °C, relative humidity of 50% under conditions: distance between grippers, 115 mm; test speed, 5 mm/min. The higher this value, the more excellent mechanical strength. The value is preferably 160 MPa or more from the viewpoint of versatility.

(4) Peel Strength

The peel strength of the plating layer of the plated molding was measured according to the following procedure for evaluation. First, the pellets of the polyphenylene sulfide resin composition obtained in Examples and Comparative Examples were dried at 130 °C for 3 hours using a hot-air dryer, then supplied to an injection molding machine (SE-50D) manufactured by Sumitomo Heavy Industries, Ltd., which was set to a cylinder temperature of 310 °C and mold temperature of 145 °C. A square test piece with a side length L of 80 mm and thickness t of 3 mm as shown in FIGS. 1(*a*) and 1(*b*) was molded under condition of an injection speed of 100 mm/s, from which a rectangular test piece with a width L2 of 15 mm, a length of 80 mm, a thickness of 3 mmt was cut out. For the cut out rectangular test piece, a plating layer was formed on the molding by the following method.

A test piece was irradiated with ultraviolet light having dominant wavelengths of 184.9 nm and 253.7 nm for 60 minutes from a height of 30 mm from the surface of the test piece using a compact UV irradiation equipment (KOL1-3005 manufactured by Koto Electric Co., Ltd.) equipped with one high-output low-pressure mercury lamp (300 W) having dominant wavelengths of 184.9 nm and 253.7 nm, and then immersed in an aqueous potassium hydroxide solution with a concentration of 20% by weight for 12 minutes to perform the surface treatment process.

Next, a 0.3 g/dm$^3$ aqueous palladium dichloride solution as a catalyst solution was applied to the surface of the molding obtained in the above-described process, surface of which had been roughened, and then a 20 g/dm$^3$ aqueous sodium phosphinate solution was used to reduce palladium dichloride on the surface of the PPS resin surface to metal, thereby forming metallic nuclei for smooth deposition of electroless NiP plating (catalyst application process and activation process).

Next, a chemical copper plating process was performed using a molding with metallic palladium deposited on its surface, which was obtained in the above process.

Adhesive force of the resulting plated molding was measured according to the testing method of adhesive force of JIS H8630: 2006 Annex 1 (Provision). "*" indicates that no plating is formed, "D" indicates that the peel strength is less than 1 N/cm, "C" indicates that the peel strength is 1 N/cm or more and less than 3 N/cm, "B" indicates that the peel strength is 3 N/cm or more and less than 10 N/cm, and "A" indicates that the peel strength is 10 N/cm or more.

Examples 1, 2, and Comparative Examples 1 to 3 show that when the content of the polyphenylene sulfide resin (A-1) having MFR of 50 to 600 g/10 min at 315 °C under a load of 2160 g is small, the peel strength of the plating layer is small, and the adhesiveness of the plating layer tends to decrease.

A comparison of Example 1 and Examples 3 to 7 shows that platability is improved by further adding the functional group-containing olefinic copolymer. Particularly, in Examples 4 and 5, adhesiveness of the plating layer is found to be further improved.

The results of Examples 1, 10, and 11 also show that for the addition amount of the fibrous filler (B), 40 to 80 parts by weight of the fibrous filler with respect to 100 parts by weight of the polyphenylene sulfide resin (A) is effective especially for improvement of the adhesiveness of the plating layer.

The results of Examples 12 and 13 also show that when the addition amount of the non-fibrous inorganic filler is high, the pore size after the surface treatment process tends to increase, and the adhesiveness of the plating layer tends to decrease.

The results of Comparative Examples 4 to 6 also show that the plating layer is not formed as the pore size increases.

TABLE 1

| | Composition | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| PPS | PPS-1 | 100 | | 100 | 100 | 100 | 100 | 100 | 100 | 100 | 100 | 100 | 100 | 100 |
| resin | PPS-2 | | 100 | | | | | | | | | | | |
| | PPS-3 | | | | | | | | | | | | | |
| | PPS-4 | | | | | | | | | | | | | |
| | PPS-5 | | | | | | | | | | | | | |
| Fibrous | B-1 | 69.9 | 69.9 | 76.6 | 76.6 | 76.6 | 76.6 | 76.6 | 76.6 | | 105.4 | 44.9 | 52.7 | 52.7 |
| filler | B-2 | | | | | | | | | 69.9 | | | | |
| Functional | C-1 | | | 9.5 | | | | | 5.7 | | | | | |
| group- | C-2 | | | | 9.5 | | | | | | | | | |

TABLE 1-continued

| | Composition | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| containing | C-3 | | | | | 9.5 | | | | | | | | |
| olefinic | C-4 | | | | | | 9.5 | | | | | | | |
| copolymer | C-5 | | | | | | | 9.5 | | | | | | |
| Non- | D-1 | 0.9 | 0.9 | 0.9 | 0.9 | 0.9 | 0.9 | 0.9 | 0.9 | 0.9 | 1.0 | 0.7 | 18.1 | |
| fibrous | D-2 | | | | | | | | | | | | | 18.1 |
| inorganic | D-3 | | | | | | | | | | | | | |
| | D-4 | | | | | | | | | | | | | |
| Olefinic copolymer | E-1 | | | | | | | | 3.8 | | | | | |
| Surface treatment process | | Method 1 | Method 1 | Method 1 | Method 1 | Method 1 | Method 1 | Method 1 | Method 1 | Method 1 | Method 1 | Method 1 | Method 1 | Method 1 |
| Arithmetic mean surface roughness of plating layer Ra [mm] | | 0.3 | 0.3 | 0.4 | 0.4 | 0.4 | 0.4 | 0.4 | 0.4 | 0.4 | 0.4 | 0.4 | 0.4 | 0.4 |
| Pore size [mm] | | <0.2 | <0.2 | <0.8 | <0.8 | <0.8 | <0.8 | <0.8 | <0.2 | <0.2 | <0.2 | <0.2 | 1~2 | 1~2 |
| Tensile strength [MPa] | | 190 | 182 | 178 | 174 | 173 | 1.60 | 147 | 175 | 173 | 194 | 161 | 174 | 173 |
| Peel strength | | C | C | B | A | A | A | B | B | B | C | B | C | C |

TABLE 2

| | Composition | Comparative Example 1 | Comparative Example 2 | Comparative Example 3 | Comparative Example 4 | Comparative Example 5 | Comparative Example 6 |
|---|---|---|---|---|---|---|---|
| PPS resin | PPS-1 | 34.5 | 34.5 | | 100 | 100 | 100 |
| | PPS-2 | | | | | | |
| | PPS-3 | 65.5 | | | | | |
| | PPS-4 | | 65.5 | | | | |
| | PPS-5 | | | 100 | | | |
| Fibrous filler | B-1 | 69.9 | 69.9 | 69.9 | 69.9 | | 105.4 |
| | B-2 | | | | | 69.9 | |
| Functional group- | C-1 | | | | | | |
| containing olefinic | C-2 | | | | | | |
| copolymer | C-3 | | | | | | |
| | C.5 | | | | | | |
| Non-fibrous inorganic | D-1 | 0.9 | 0.9 | 0.9 | 0.9 | 0.9 | 1.0 |
| filler | D-2 | | | | | | |
| | D-3 | | | | | | |
| | D-4 | | | | | | |
| Olafinic copolymer | E-1 | | | | | | |
| Surface treatment process | | Method 1 | Method 1 | Method 1 | Method 2 | Method 2 | Method 2 |
| Arithmetic mean surface roughness of plating layer Ra [mm] | | — | — | — | — | — | — |
| Pore size [mm] | | <0.2 | <0.2 | <0.2 | >10 | >10 | >10 |
| Tensile strength [MPa] | | 185 | 180 | 181 | 190 | 173 | 194 |
| Peel strength | | D | D | D | * | * | * |

INDUSTRIAL AVAILABILITY

We provide a polyphenylene sulfide resin composition for plating, which enables a plating layer having excellent surface smoothness to be formed without compromising the various excellent properties inherent in the polyphenylene sulfide resins, and is excellent in adhesiveness and ensures high plating quality even in severe environmental degradation tests such as thermal shock cycle, and also provides a resin-plated molding.

The invention claimed is:

1. A plated molding comprising:

a molding comprising a polyphenylene sulfide resin composition comprising 30 to 200 parts by weight of a fibrous filler (B) based on 100 parts by weight of a polyphenylene sulfide resin (A);

a plating layer directly disposed on a part or all of a surface of the molding wherein an arithmetic mean roughness of a surface of the plating layer of the plated molding is 1.5 μm or less;

and wherein the polyphenylene sulfide resin (A) comprises 20% by weight or more of a polyphenylene sulfide resin (A-1) having MFR of 100 to 500 g/10 min at 315 °C under a load of 2160 g, where the total amount of the polyphenylene sulfide resin (A) is 100% by weight, and wherein the polyphenylene sulfide resin composition further comprises 1 to 30 parts by weight of a functional group-containing olefinic copolymer (C) containing at least one functional group selected from the group consisting of a glycidyl group, an acid anhydride group, a carboxyl group and a salt thereof, and an alkoxycarbonyl group based on 100 parts by weight of the polyphenylene sulfide resin (A), and wherein the functional group contained in the functional group-containing olefinic copolymer (C) containing at least one functional group selected from the group consisting of a glycidyl group, an acid anhydride group, a carboxyl group and a salt thereof, and an alkoxycarbonyl group is a glycidyl group, and the glycidyl group concentration in the functional group-containing olefinic copolymer is 1.0 to 4.5% by weight.

2. The plated molding according to claim 1, wherein the polyphenylene sulfide resin (A) contains 50% by weight or more of a polyphenylene sulfide resin (A-1) having MFR of 100 to 500 g/10 min at 315 °C under a load of 2160 g, where the total amount of the polyphenylene sulfide resin (A) is 100% by weight.

3. A method of producing the plated molding according to claim 1, wherein the molding molded with the polyphenylene sulfide resin composition is subjected to a surface treatment process, a catalyst application process, an activation process, and a plating process in this order.

4. The method according to claim 3, wherein the surface treatment process is performed by:

(a) irradiating the surface of the molding from a position of 5 to 200 mm away from the surface with an ultraviolet light having a dominant wavelength of 100 to 400 nm for 10 to 120 minutes; and (b) subsequently immersing the molding processed in (a) in an alkaline aqueous solution with a concentration of 5 to 40% by mass for 1 to 30 minutes.

5. The method according to claim 3, wherein at least a part of the surface of the molding after the surface treatment process has pores with a diameter of 2 μm or less.

6. A housing component comprising the plated molding according to claim 1 as a part of its component.

* * * * *